(12) United States Patent
Blancke

(10) Patent No.: US 9,523,382 B2
(45) Date of Patent: Dec. 20, 2016

(54) LOCKING PIN AND RELATED LOCKING ELEMENT

(71) Applicant: Fairchild Fasteners Europe—Camloc GmbH, Kelkheim (Taunus) (DE)

(72) Inventor: Stefan Blancke, Kelkheim (DE)

(73) Assignee: Fairchild Fasteners Europe-Camloc GmbH, Kelkheim (Tanus) (DE)

( * ) Notice: Subject to any disclaimer, the term of this patent is extended or adjusted under 35 U.S.C. 154(b) by 0 days.

(21) Appl. No.: 14/432,829

(22) PCT Filed: Sep. 4, 2013

(86) PCT No.: PCT/EP2013/068306
§ 371 (c)(1),
(2) Date: Apr. 1, 2015

(87) PCT Pub. No.: WO2014/053280
PCT Pub. Date: Apr. 10, 2014

(65) Prior Publication Data
US 2015/0247518 A1    Sep. 3, 2015

(30) Foreign Application Priority Data
Oct. 4, 2012   (DE) .................... 20 2012 009 468 U

(51) Int. Cl.
*F16B 35/02*   (2006.01)
*F16B 21/12*   (2006.01)
*F16B 5/02*    (2006.01)
*F16B 31/02*   (2006.01)

(52) U.S. Cl.
CPC ................ *F16B 21/12* (2013.01); *F16B 5/02* (2013.01); *F16B 31/021* (2013.01)

(58) Field of Classification Search
CPC ........... F16B 5/02; F16B 21/12; F16B 31/021; F16B 35/021; F16B 35/02
USPC ......................................... 411/383, 396, 432
See application file for complete search history.

(56) References Cited

U.S. PATENT DOCUMENTS

| | | | |
|---|---|---|---|
| 1,394,608 A * | 10/1921 | Davern | F16B 35/044 29/271 |
| 1,988,813 A * | 1/1935 | Seguin | F16B 35/00 411/373 |
| 2,368,713 A | 2/1945 | Kane | |
| 2,378,122 A | 6/1945 | Barlow | |
| 2,840,404 A * | 6/1958 | Weber, Jr. | F16B 5/06 403/146 |
| 3,702,628 A | 11/1972 | Cosenza | |
| 3,963,361 A | 6/1976 | Schenk | |
| 4,309,140 A * | 1/1982 | Steffen | F16B 39/38 411/264 |

(Continued)

FOREIGN PATENT DOCUMENTS

DE         1 450 944       12/1971
DE    10 2009 038 644 A1    3/2011

(Continued)

*Primary Examiner* — Roberta Delisle
(74) *Attorney, Agent, or Firm* — Greenberg Traurig, LLP

(57) ABSTRACT

A locking pin with a stud having locking means and retaining means, wherein the stud has at least two separate stud elements, one of which serves as the locking means and the other as the retaining means. The at least two stud elements are rotationally fixed and are connected releasably in axial direction.

12 Claims, 3 Drawing Sheets

(56) References Cited

U.S. PATENT DOCUMENTS

| | | | | |
|---|---|---|---|---|
| 4,642,012 A | * | 2/1987 | Blucher | F16B 37/127 411/383 |
| 4,784,554 A | * | 11/1988 | Break | B25B 5/104 403/341 |
| 4,872,795 A | * | 10/1989 | Davis | F16B 33/002 411/432 |
| 5,525,001 A | * | 6/1996 | Perkins | B62D 27/065 403/157 |
| 5,582,496 A | * | 12/1996 | Ambrico | F16B 39/12 411/243 |
| 5,769,583 A | * | 6/1998 | Girbinger | F16B 35/042 411/388 |
| 6,464,441 B2 | * | 10/2002 | Kupper | F16B 12/24 411/383 |
| 2010/0209212 A1 | * | 8/2010 | Matarrodona Martinez | F16B 35/02 411/366.3 |

FOREIGN PATENT DOCUMENTS

| | | |
|---|---|---|
| EP | 0 791 759 A1 | 8/1997 |
| EP | 2 410 189 A1 | 1/2012 |
| EP | 2 439 418 A1 | 4/2012 |
| GB | 2 074 642 A | 11/1981 |

\* cited by examiner

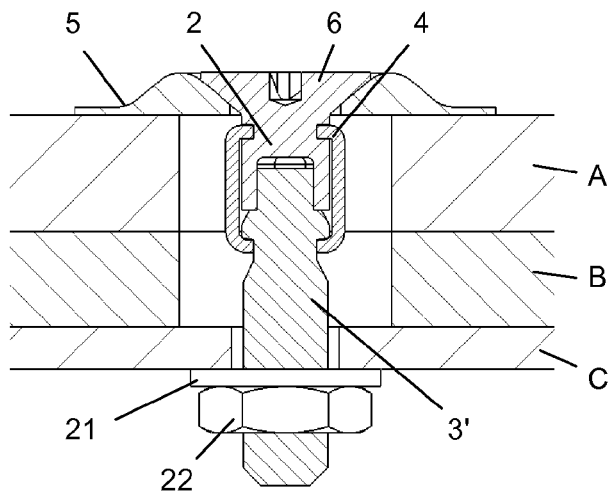
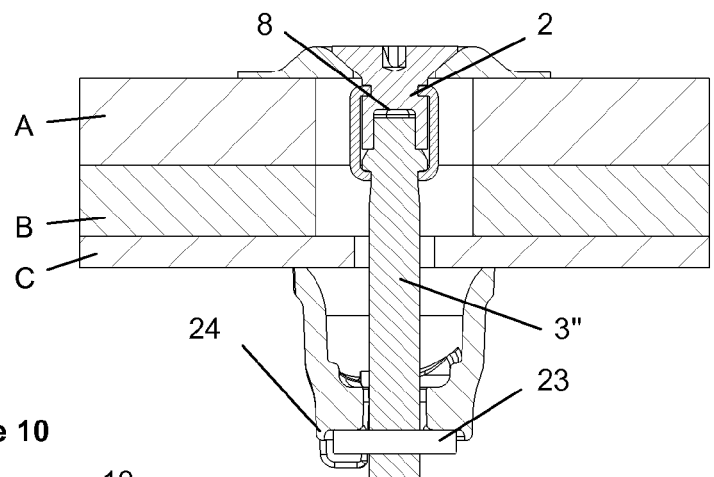
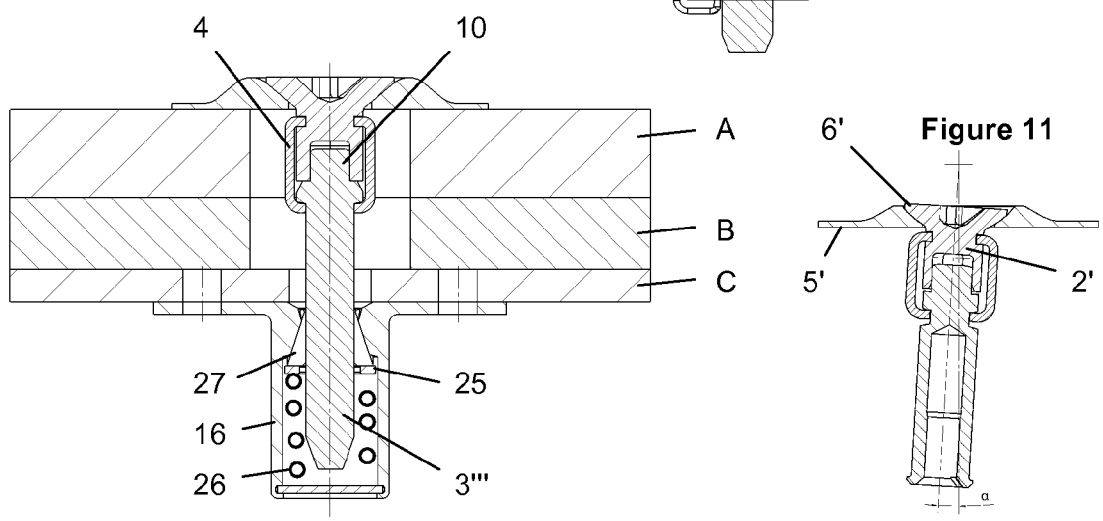
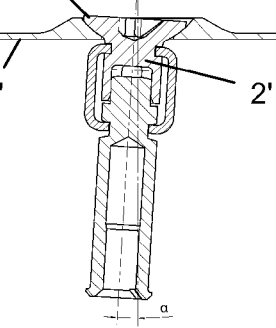

LOCKING PIN AND RELATED LOCKING ELEMENT

CROSS-REFERENCE TO RELATED APPLICATION

This application is a U.S. national stage entry of International Patent Application No. PCT/EP2013/068306, filed on Sep. 4, 2013, entitled FASTENER BOLT AND FASTENER ELEMENT HAVING THE SAME, which claims the benefit of German Patent Application No. DE 20 2012 009 468.8, filed on Oct. 4, 2012, each of foregoing being incorporated herein by reference in its entirety.

FIELD OF THE INVENTION

The invention relates to a locking pin that may be used like a screw, for example, and a related locking element. The locking element may have the pin and a fastener connectable thereto in order to connect components.

BACKGROUND OF THE INVENTION

Locking elements are known in the form of a screw or as a quick-release (such as a one-quarter-turn locking element as known from U.S. Pat. No. 2,368,713 or U.S. Pat. No. 2,378,122, a quick-release with a divided nut similar to U.S. Pat. No. 3,702,628 or a ratchet connector similar to DE 1 450 944), and they have the object of holding two or more components together or attaching them to each other. In doing so, the components have through openings that may be superimposed on each other such that the pin may be inserted through the through openings and secured with the fastener. In order to transfer the resulting clamping force to the components, washers may be provided on the head of the pin and/or the fastener, the external diameter of which is larger than the internal diameter of the respective through opening.

It may be necessary for some applications to generate a specific pretension with such locking element. In doing so, some security applications may require said pretension to be limited. Thus, if the force were to exceed a given level of the pretension significantly, the components should be separated. It is particularly advantageous in such instances that the separation of the components is instantaneous.

A decompression connector is known from DE 10 2009 038 644 A1 and EP 2 410 189 A1, respectively, wherein a locking pin is provided with a grooved depression on one side that snaps into a spring-loaded snap-lock, which is supported by one of the components. When the axial force exerted on the locking pin exceeds a specific level, the snap-element disengages from the depression, such that the lock disengages automatically. The spring-loaded snap-lock requires more space than conventional locks, such that these solutions may be unsuited to certain applications.

SUMMARY OF THE INVENTION

The object of the present invention is therefore to create a compact pin and a locking element which are separable immediately in instances of specified load levels.

This object is essentially achieved according to the invention in that for a locking pin with a stud having locking means, such as a thread or the like, and retaining means, such as a pin head or the like, the stud has at least two separate stud elements, one of which having the locking means and the other having the retaining means, wherein the at least two stud elements are rotationally fixed and are connected releasably in axial direction. The stud elements are preferably releasably connected in axial direction such that they will separate, including separating the rotationally fixed connection, particularly without destruction, if an axial tensile force exerting on the stud elements exceeds a certain threshold, said threshold preferably being adjustable by the selection of connecting means or the design thereof. Consequently, the locking pin is suited for use in a decompression lock in an airplane, for example, which must open automatically at a certain axial load due to a sudden loss of pressure.

In other words, given the rotationally fixed connection of the two separate stud elements, the stud may be employed in the same manner as a common pin stud, i.e., a threaded connection may be disengaged or tightened or a rotary lock may be opened or closed. In the axially unloaded condition of the pin, the two stud elements are also connected in axial direction such that the pin, consisting of at least two separate components, will act in the same manner as an integral component. The stud is thus also suitable to transfer an axial tensile force that is limited in one direction. The two stud elements will instantaneously and automatically separate only if a certain level of axial tensile force is exceeded.

Preferably, the at least two stud elements are axially connected by means of a detachable clamp. In doing so, the clamp may be connected to the stud elements such that they separate automatically from at least one of the stud elements, when a level of force exerted in axial direction onto the at least two stud elements exceeds a certain value. Consequently, the locking pin will separate instantaneously and automatically if a pre-specified axial load is reached.

Each of the at least two stud elements may have a groove, into which engages a segment of the clamp pointing radially inwards, such as a collar or a protuberance.

In order to provide a rotationally fixed connection, each of the at least two stud elements have non-rotationally symmetrical connection areas. This may be embodied by means of a multi-edge profile or a spur gear. Thus, the locking pin may transfer or apply torque in the same manner as a conventional screw.

The fastening means of the locking pin may comprise a thread or a cross pin. Furthermore, at least one of the stud elements may be designed hollow.

A locking element to connect components according to the invention may have such a locking pin and a fastener connectable thereto.

An angle compensation between the rotation axes of the pin and the fastener may be achieved, for example, by embodying the head of the locking pin as a spherical cap that is pivotably supported by a corresponding counter contact surface of a disk.

Preferably, the locking element consists of a locking pin that is embodied as a screw with an external thread and a fastener that is a nut with an internal thread.

According to an alternative embodiment, the locking element is designed as a one-quarter-turn locking element, wherein the locking pin may have a head on one side and a cross pin on the other side. The fastener may then be embodied as having a cam-contour with a ramp and a recessed holding area opposite thereto. Other fastening options include a bayonet-like fixation between the pin and the fastener.

In order to fasten the locking pin more quickly, the fastener has a housing with a cone and a divided nut received within said housing, wherein the segments of the nut are axially displaceable relative to the cone against the force exerted by a spring element, in order to enlarge the nut radially. When the screw is tightened, the segments of the nut are pushed back against the cone, supported by the spring element such that the nut segments move radially inwards in order to establish the thread connection with the locking pin.

The pin of a further embodiment has a head on one side and a central opening with an internal thread on the other side, wherein the fastener comprises a housing having a rotationally fixed holding cam screw with external threads and possibly a ratchet assembly therein.

Similar to DE 1 450 944, the ratchet assembly may be spring-loaded to secure the locking element against unintentional release of the thread connection.

The invention is explained in more detail below by means of embodiment examples and by reference to the drawings.

BRIEF DESCRIPTION OF THE DRAWINGS

FIG. 11 schematically shows a cross section of the locking element according to a further embodiment of the invention.

DETAILED DESCRIPTION OF THE DRAWINGS

Figure 1:
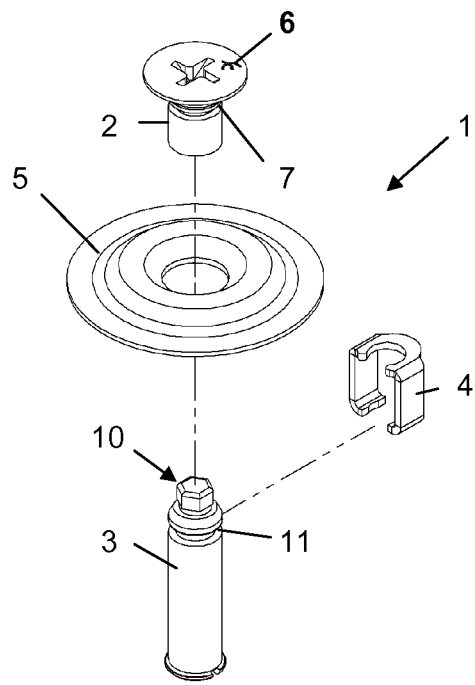
FIG. 1 schematically shows a perspective view of the components of a locking pin according to a first embodiment of the invention, FIG. 2 schematically shows a perspective view of the locking pin of FIG. 1, FIG. 3 schematically shows a cross section of the locking pin of FIG. 1, FIG. 4 schematically shows an enlarged detail of FIG. 3, FIG. 5 schematically shows a cross section of a locking element with a locking pin of FIG. 1 in a compressed state, FIG. 6 schematically shows the locking element of FIG. 5 in a non-compressed state, FIG. 7 schematically shows a perspective view of the clamp of the locking pin of FIG. 1, FIG. 8 schematically shows a cross section of the locking element according to a second embodiment of the invention, FIG. 9 schematically shows a cross section of the locking element according to a third embodiment of the invention, FIG. 10 schematically shows a cross section of the locking element according to a fourth embodiment of the invention.

Locking pin 1 shown in FIG. 1 has essentially three components, namely a first top stud element 2, shown in FIG. 1, a bottom second stud element 3, shown in FIG. 1, and clamp 4 to connect the two stud elements 2, 3. In addition, FIG. 1 shows disk 5, which may be used together with locking pin 1 similar to a washer.

Figure 3:
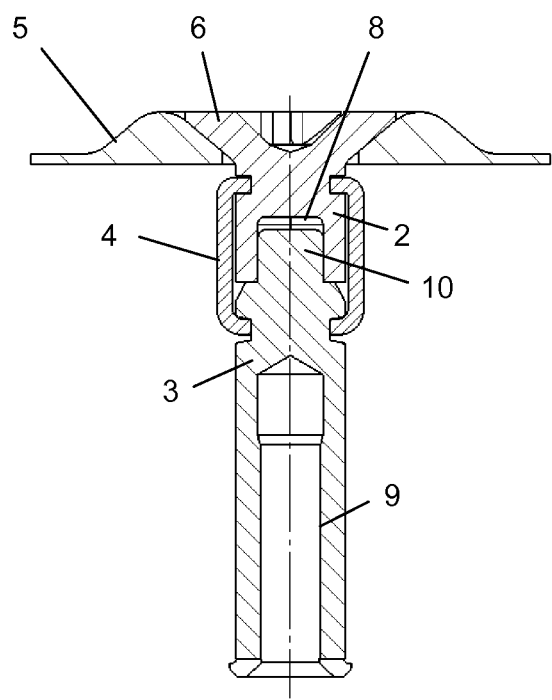

As can also be seen from the cross section view of FIG. 3, a head 6 is formed at the first stud element 2, which head has a larger diameter than that of the remaining stud element 2. The depicted embodiment shows the lower side of head 6 in FIGS. 1 and 3 with a conical shape, wherein disk 5 is also provided with a corresponding shape which can support head 6. Alternatively, the lower side of head 6 and disk 5 may each be formed as a spherical cap, such that head 6 may be pivotably supported.

Furthermore, head 6 is provided with engagement means for a tool, namely crossed slits in the depicted embodiment. FIG. 3 shows a circumferential groove 7 below head 6 of the first stud element 2. Furthermore, the first stud element 2 has a central opening 8, shown in FIG. 3 at the bottom.

The second stud element 3 is shown in the depicted embodiment as a sleeve with an internal thread 9 to connect to a component with external thread. An upper connection area 10, shown in the Figures, of the second stud element 3 has a non-rotationally symmetric external shape. The depicted embodiment shows connection area 10 as a hexagon. Accordingly, the internal shape of opening 8 of the first stud element 2 is likewise designed as a hexagon, such that the connection area 10 can be inserted rotationally fixed into opening 8. Thus, the first stud element 2 is not pivotable relative to the second stud element 3 in the mounted position shown in FIG. 3.

Figure 7:
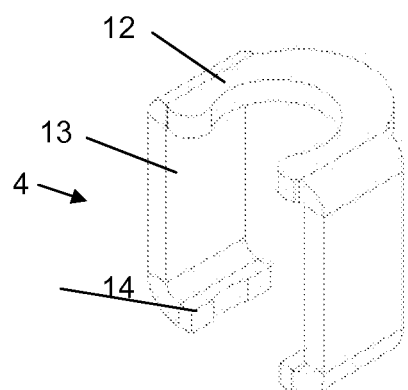

The first stud element 2 is attached to the second stud element 3 by means of clamp 4 in axial direction, i.e., in the direction of the dotted longitudinal axis shown in FIGS. 1 and 3. In this regard, the second stud element 3 also has a circumferential groove 11. As shown in the enlarged depiction in FIG. 7, clamp 4 has a top collar 12 in the Figures, which has an opening that permits clamping of clamp 4 onto the first stud element 2. In doing so, collar 12 may be designed such that clamp 4 may be snapped onto the first stud element 2. FIG. 7 shows that two arms 13 extend downwards from collar 12, wherein each of the bottom ends of the arms have a holding protrusion 14 extending radially inwards. In doing so, the holding protrusions 14 respectively engage with groove 11 of the second stud element 3.

Figure 4:
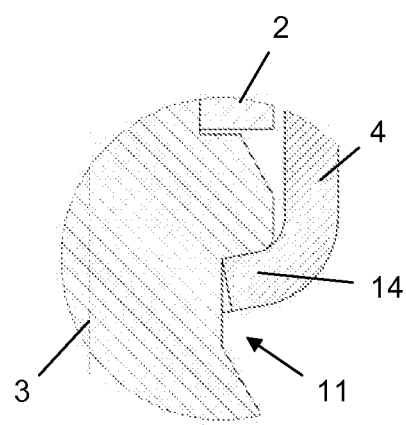

The enlarged cross section view in FIG. 4 shows that holding protrusions 14 and/or the outer contour of the second stud element 3 are tapered in the area of groove 11 such that clamp 4 may detach from groove 11, when a sufficiently large tensile load acts between the first stud element 2 and the second stud element 3. The axial force required for holding protrusions 14 to detach from groove 11 can be adjusted defined by the design of holding protrusion 14 and the outer contour of the second stud element 3 in the area of groove 11. For such purpose, the stiffness of the material forming clamp 4 is decisive, as well.

Figure 2:
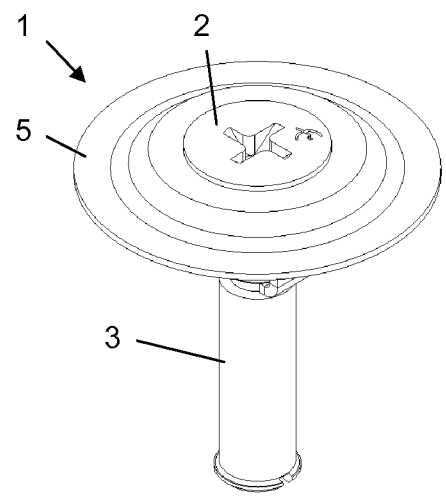

As long as the components of locking pin 1 are connected to each other as is shown in FIGS. 2 and 3, the locking pin will act as a single unit until an axial force is achieved that is sufficient to detach clamp 4 from groove 11, i.e., locking pin 1 is capable of transferring torque as well as an axial force.

Figure 5:
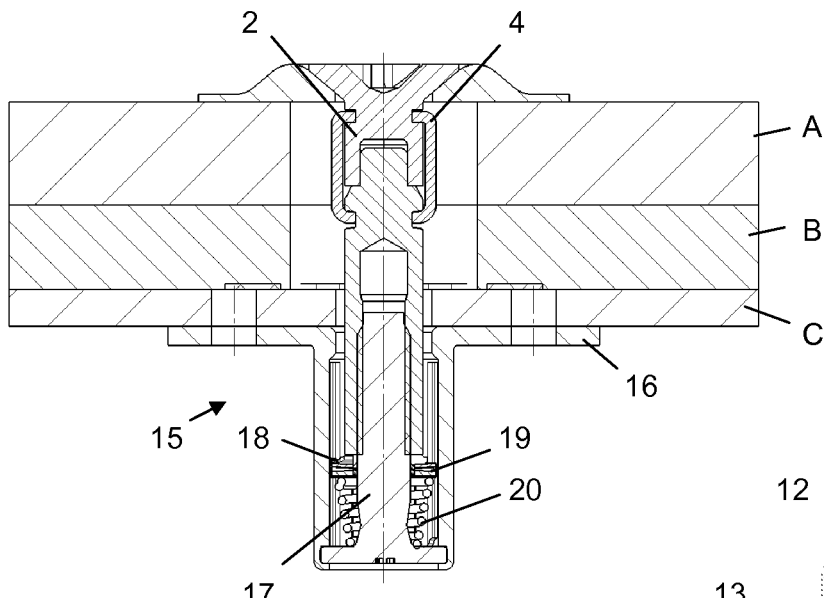
Figure 6:
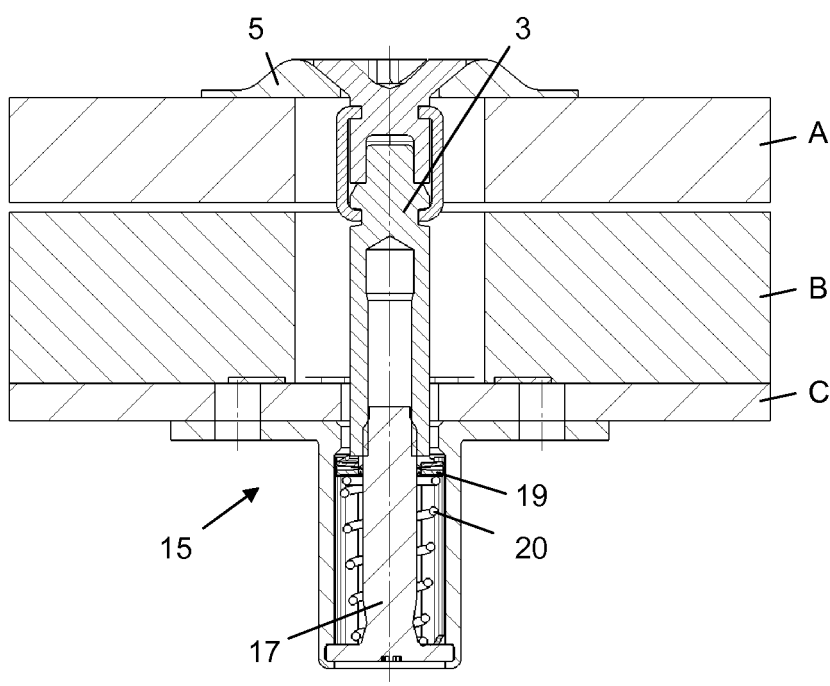

FIGS. 5 and 6 depict a first exemplary embodiment of locking pin 1 to connect three plate-shaped components A, B, C. FIG. 6 shows the locking element here at the beginning of the fixation process, whereas FIG. 5 depicts the situation in which components A, B, C are braced to one another. Component B is shown to be compressible between components A and C in the embodiment shown here, such that the height of component B in FIG. 5 is shown to be less than its height in FIG. 6. Furthermore, FIG. 6 shows a gap between components A and B.

Locking pin 1 shown in FIG. 1 to 4 is inserted into a through-opening of components A and B to connect components A, B, C, wherein disk 5 supports head 6 at component A. The second stud element 3 of locking pin 1 extends through the through-opening provided in component C. Furthermore, component C defines a fixation element 15 to connect with locking pin 1.

Fixation element 15 first has a housing 16, which is firmly affixed to component C. Threaded pin (holding cam screw) 17 with external threads is defined in housing 16 and extends upwards in the Figures, such that internal thread 9 of the second stud element 3 can be screwed onto threaded pin 17. FIGS. 5 and 6 show an additional safety in fixation element 15 to prevent the threaded connection from opening, for example as a result of vibrations. In doing so, what is shown in the Figures as the lower end of the second stud element 3 is non-rotationally secured to a profiled disk 18 that is guided rotationally free in housing 16. A similarly profiled disk 19 is secured against rotation and guided axially displaceable in housing 16, whereas disks 18 and 19 cannot be rotated relative to each other, when their respective profiles make engage with one another. Furthermore, disk 19 is supported by spring 20, which is pre-tensioned such that disks 18 and 19 are pressed against each other and against what is shown in the Figures as the lower end of locking pin 1. The situation depicted in FIG. 6 permits locking pin 1 to rotate relative to housing 16, wherein the profiles of disks 18 and 19 engage on top of each other. In doing so, disks 18 and 19 are lifted off of one another against the force of spring 20. However, the pre-tension of spring 20 shown in the position of FIG. 5 prevents disks 18 and 19 to move relative to each other due to vibrations, such that the screw connection of locking pin 1 to the threaded pin 17 cannot disengage automatically.

FIG. 8 depicts a second embodiment, wherein the three components A, B and C are again connected by a locking element according to the invention. Locking pin 1 has a similar design as in the embodiment described above, namely including a first stud element 2, clamp 4 and a second stud element 3', which has external threads in the embodiment depicted in FIG. 8. Connection area 10 and groove 11, however, are embodied as described above. Disk 21 and nut 22 jointly form a fixation element to brace locking pin 1 to components A, B and C.

In the embodiment according to FIG. 9, the first stud element 2 and clamp 4 are designed as described above. It is noteworthy in comparison to FIG. 8 that the second stud element 3" is embodied as an elongated pin having a cross pin 23 extending crosswise to its bottom end in FIG. 9. Cam contour 24 serves as fixation element for locking pin 1, which cam contour is braced by what is shown in FIG. 9 as the bottom side of component C. In a manner similar to the description of U.S. Pat. No. 2,368,713 or U.S. Pat. No. 2,378,122, cam contour 24 may be designed having a ramp and an holding area recessed with respect thereto into which cross pin 23 may engage in order to securely connect locking pin 1 to cam contour 24.

The fourth embodiment of the locking element depicted in FIG. 10 shows a locking pin 1, wherein the second stud element 3''' is embodied as a pin with an external thread. The fixation element has a housing 16, which is similar to the housing described in connection with FIGS. 5 and 6, in which a disk 25 is guided, which is applied upwards by spring 26, as shown in FIG. 10. Tapered nut segments 27 are positioned above disk 25, said nut segments being supported at a corresponding opposite conical counter surface of housing 16. When locking pin 1 is inserted into the openings of components A, B, C and into the fixation element, locking pin 1 displaces the various segments 27 of the nut pushing downwards as shown in FIG. 10 against spring 26, such that locking pin 1 can be inserted through the enlarged nut. When locking pin 1 is tightened, the nut formed by segments 27 is then pushed back into the cone of housing 16 supported by spring 26 and thus presses radially against the external threads of the second stud element 3''', creating a threaded connection with locking pin 1.

FIG. 11 depicts a further embodiment of a locking pin, wherein head 6' of the upper stud element 2' is modified, for example, with respect to the embodiment shown in FIG. 3. In lieu of the conical contour of the bottom side of head 6 and at the corresponding counter contour of disk 5, a spherical or rounded embodiment is provided which facilitates stud element 2' to be pivotable relative to disk 5'. This makes sense as an offset, if the axial alignment between disk 5' and stud element 2' is not perfect, as depicted in FIG. 11. Bending stress would be generated in the absence of the spherical surface, such stress being undesirable in the locking pin and in particular having influence on the disengaging behaviour of clamp 4.

The locking elements according to FIG. 8 to 10 could also be provided with the modified locking pin according to in FIG. 11.

| Reference Terms | |
|---|---|
| 1 | Locking pin |
| 2, 2' | First stud element |
| 3, 3', 3", 3''' | Second stud element |
| 4 | Clamp |
| 5, 5' | Disc |
| 6, 6' | Head |
| 7 | Groove |
| 8 | Opening |
| 9 | Internal thread |
| 10 | Joint |
| 11 | Groove |
| 12 | Collar |
| 13 | Bracket |
| 14 | Holding protrusion |
| 15 | Fastener |
| 16 | Housing |
| 17 | Threaded pin |
| 18 | Disk |
| 19 | Disk |
| 20 | Spring |
| 21 | Disk |
| 22 | Nut |
| 23 | Cross pin |
| 24 | Cam contour |
| 25 | Disc |
| 26 | Spring |
| 27 | Groove segment |
| A | Component |
| B | Component |
| C | Component |

What is claimed is:

1. A locking pin with a stud having locking means and retaining means, the stud having at least two separate stud elements, one of which serves as the locking means and the other as the retaining means, wherein the at least two stud elements are rotationally fixed and are connected releasably in an axial direction by a releasable clamp, wherein the clamp is connected to the stud elements in such a manner that the stud elements will separate automatically from at least one of the stud elements when a force exerted in an axial direction on the at least two stud elements exceeds a predetermined level.

2. The locking pin of claim 1 wherein each of the at least two stud elements has a groove which engages a segment of clamp, respectively, that points towards the radial interior.

3. The locking pin of claim 1, where the at least two stud elements have respective connection segments that are not rotationally symmetrical and which form a rotationally fixed connection when engaged with one another.

4. The locking pin of claim 1, wherein the locking means includes threads.

5. The locking pin of claim 1, wherein the locking means includes a cross pin.

6. The locking pin of claim 1, wherein a stud element is at least sectionally hollow.

7. A fastening system, comprising:
   a locking pin with a stud having locking means and retaining means, the stud having at least two separate stud elements, one of which serves as the locking means and the other as the retaining means, and wherein the at least two stud elements are rotationally fixed and are connected releasably in axial direction by a releasable clamp, wherein the clamp is connected to the stud elements in such a manner that the stud elements will separate automatically from at least one of the stud elements when a force exerted in an axial direction on the at least two stud elements exceeds a predetermined level; and a fastener connectable to the locking pin.

8. The fastening system of claim 7, wherein the locking pin is a screw with external threads and the fastener is a nut with internal threads.

9. The fastening system of claim 7, wherein the locking pin has a head on one side and a cross pin on the other side, wherein the fastener has a cam contour with a ramp and a recessed holding area opposite thereto.

10. The fastening system of claim 7, wherein the fastener includes a housing with a cone and a divided nut received within the housing, wherein the segments of nut are axially displaceable relative to the cone against a force exerted by a spring element.

11. The fastening system of claim 7, wherein the locking pin includes a head on one side and a central opening with interior threads on the other side, wherein the fastener includes a housing having rotationally fixed retaining cam screw therein with exterior threads and a ratchet assembly.

12. The fastening system of claim 7, further comprising a disk to support a head of locking pin, and wherein the underside of the head and the counter contour of the disk have spherical surfaces.

* * * * *

UNITED STATES PATENT AND TRADEMARK OFFICE
CERTIFICATE OF CORRECTION

| | | |
|---|---|---|
| PATENT NO. | : 9,523,382 B2 | Page 1 of 1 |
| APPLICATION NO. | : 14/432829 | |
| DATED | : December 20, 2016 | |
| INVENTOR(S) | : Stefan Blancke | |

It is certified that error appears in the above-identified patent and that said Letters Patent is hereby corrected as shown below:

In the Specification

Column 5, Line 6, delete "make engage" and insert --may engage--.

Column 5, Line 15, delete "to move" and insert --from moving--.

Column 6, Line 8, delete "to in FIG. 11" and insert --to FIG. 11--.

In the Claims

Column 6, Line 51, delete "1 wherein" and insert --1, wherein--.

Signed and Sealed this
Seventeenth Day of October, 2017

Joseph Matal
*Performing the Functions and Duties of the
Under Secretary of Commerce for Intellectual Property and
Director of the United States Patent and Trademark Office*